(12) United States Patent
Mu

(10) Patent No.: US 12,096,491 B2
(45) Date of Patent: Sep. 17, 2024

(54) RANDOM ACCESS MESSAGE TRANSMISSION METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 324 days.

(21) Appl. No.: 17/669,924

(22) Filed: Feb. 11, 2022

(65) Prior Publication Data

US 2022/0167435 A1    May 26, 2022

Related U.S. Application Data

(63) Continuation of application No. PCT/CN2019/100635, filed on Aug. 14, 2019.

(51) Int. Cl.
*H04W 74/0833* (2024.01)
*H04W 74/00* (2009.01)

(52) U.S. Cl.
CPC ..... *H04W 74/0841* (2013.01); *H04W 74/008* (2013.01)

(58) Field of Classification Search
CPC .................. H04W 74/0841; H04W 74/008
See application file for complete search history.

(56) References Cited

FOREIGN PATENT DOCUMENTS

| CN | 110087258 A | 8/2019 |
| WO | WO 2018127240 A1 | 7/2018 |
| WO | WO 2018175809 A1 | 9/2018 |
| WO | WO 2018202042 A1 | 11/2018 |

OTHER PUBLICATIONS

CATT "Reception of Msg2 and msgB" 3GPP TSG-RAN2 Meeting #106, R2-1905754, May 2019; 6 pages.
PCT/CN2019/100635 International Search Report dated May 11, 2020, 2 pages.
Russian Patent Application No. 2022105910, Office Action dated Oct. 26, 2022, 10 pages.
Russian Patent Application No. 2022105910, English translation of Office Action dated Oct. 26, 2022, 7 pages.
European Patent Application No. 19941308.9, Search and Opinion dated Aug. 5, 2022, 11 pages.
CATT "Consideration on 2-step RA" 3GPP TSG RAN WG2 Meeting Ad Hoc, R2-1700205, Jan. 2017, 6 pages.
CATT "MAC RAR PDU" 3GPP TSG-RAN WG2 #99bis, R2-1710292. Oct. 2017, 6 pages.
Indian Patent Application No. 202247013123, Office Action dated Aug. 8, 2022, 6 pages.

*Primary Examiner* — James P Duffy
(74) *Attorney, Agent, or Firm* — Cozen O'Connor

(57) ABSTRACT

A random access message transmission method, apparatus, and/or base station implementing the method includes: sending a second random access message Msg. B corresponding to N terminals after receiving first random access messages Msg. A sent by the N terminals, where N is an integer greater than or equal to 1; in which, the Msg. B includes respective exclusive information of the N terminals; exclusive information includes a type label of the exclusive information of a terminal; the type label is configured to indicate a length of the exclusive information of the terminal.

20 Claims, 8 Drawing Sheets

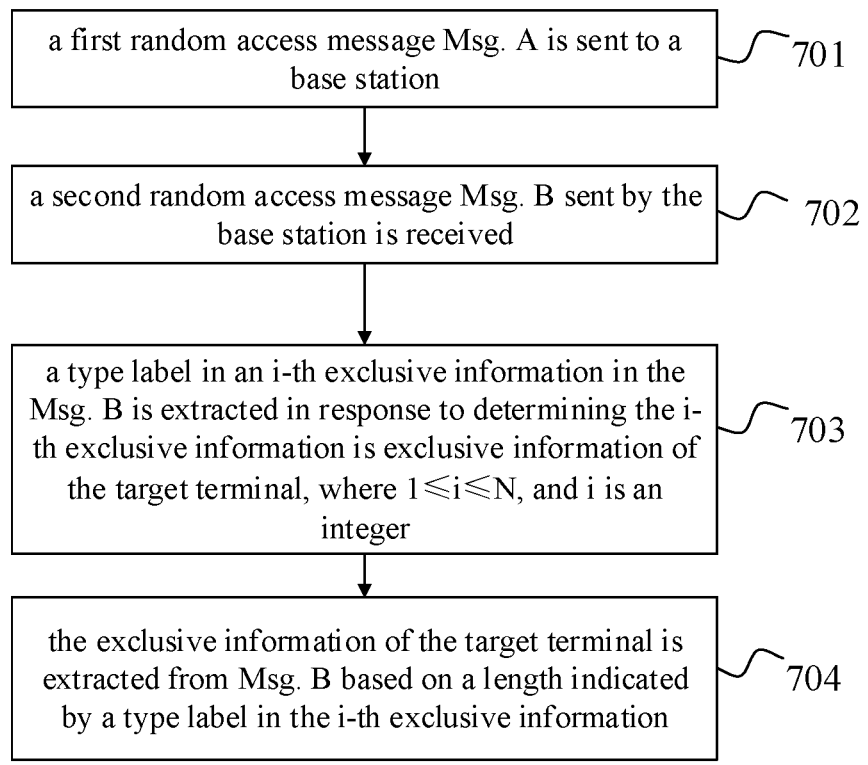

RANDOM ACCESS MESSAGE TRANSMISSION METHOD AND APPARATUS

CROSS-REFERENCE TO RELATED APPLICATION

This application is a continuation application of PCT Application No. PCT/CN2019/100635, filed on Aug. 14, 2019, the entire contents of which are incorporated herein by reference.

TECHNICAL FIELD

This application relates to a field of wireless communication technologies, and in particular, to a random access message transmission method and apparatus.

BACKGROUND

With the development in the field of wireless communication technologies, users' demands for wireless communication are becoming increasingly diversified, which promotes the continuous evolution of wireless communication technology to the fifth generation mobile communication (5G) network.

With the support of 5G NR (New Radio), the Third Generation Partnership Project (3GPP) has carried out the standardization of two-step (2-step) random access, and proposed a two-step random access mechanism. That is, a terminal sends a first random access message Msg. A to a base station, and the base station returns a second random access message Msg. B to the terminal based on the first random access message Msg. A, thus completing the random access between the terminal and the base station. Regarding the proposed two-step random access process, as the sizes of the respective exclusive information contained in Msg. B are not fixed, the terminal cannot accurately extract its own exclusive information from the respective exclusive information.

SUMMARY

The present disclosure provides a random access message transmission method and apparatus. The technical solutions are disclosed in the following.

According to an aspect of the embodiments of the present disclosure, a random access message transmission method is provided. The method is performed by a base station, and the method includes: sending a second random access message Msg. B corresponding to N terminals after receiving first random access messages Msg. A sent by the N terminals, where N is an integer greater than or equal to 1; in which, the Msg. B includes respective exclusive information of the N terminals; exclusive information includes a type label of the exclusive information of a terminal; the type label is configured to indicate a length of the exclusive information of the terminal.

According to an aspect of the embodiments of the present disclosure, a random access message transmission method is provided. The method is performed by a target terminal, and the method includes: sending a first random access message Msg. A to a base station; receiving a second random access message Msg. B sent by the base station; in which the Msg. B includes respective exclusive information of N terminals, the N terminals include the target terminal, where N is an integer greater than or equal to 1; the exclusive information includes a type label of the exclusive information of a terminal; the type label is configured to indicate a length of the exclusive information of the terminal; extracting a type label in an i-th exclusive information in the Msg. B in response to determining the i-th exclusive information is exclusive information of the target terminal, where $1 \le i \le N$, and i is an integer; and extracting the exclusive information of the target terminal from Msg. B based on a length indicated by a type label in the i-th exclusive information.

According to an aspect of the embodiments of the present disclosure, a random access message transmission apparatus is provided. The apparatus is applied in a target terminal, and the apparatus includes: a processor, a memory storing instructions executable by the processor, in which the processor is configured to: send a first random access message Msg. A to a base station; receive a second random access message Msg. B sent by the base station; in which the Msg. B includes respective exclusive information of N terminals, the N terminals include the target terminal, where N is an integer greater than or equal to 1; the exclusive information includes a type label of the exclusive information of a terminal; the type label is configured to indicate a length of the exclusive information of the terminal; extract a type label in an i-th exclusive information in the Msg. B in response to determining the i-th exclusive information is exclusive information of the target terminal, where $1 \le i \le N$, and i is an integer; and extract the exclusive information of the target terminal from Msg. B based on a length indicated by a type label in the i-th exclusive information.

It is to be understood that the foregoing general description and the following detailed description are exemplary only and do not limit the present disclosure.

BRIEF DESCRIPTION OF THE DRAWINGS

The accompanying drawings, which are incorporated in and constitute a part of this specification, illustrate embodiments consistent with the disclosure, and serve to explain the principles of the present disclosure together with the descriptions.

FIG. 6 is a method flowchart of a random access message transmission method provided by an embodiment of the present disclosure;

FIG. 7 is a method flowchart of a random access message transmission method provided by an embodiment of the present disclosure;

DETAILED DESCRIPTION

Exemplary embodiments will be described in detail herein, examples of which are illustrated in the accompanying drawings. The following description refers to the drawings, the same numerals in different drawings refer to the same or similar elements unless otherwise indicated. The implementations described in the illustrative examples below are not intended to represent all implementations consistent with the present disclosure. Instead, they are merely examples of apparatus and methods consistent with some aspects of the present disclosure as recited in the appended claims.

It should be understood that reference herein to "several" refers to one or more, and "a plurality of" refers to two or more. The term "and/or", which describes an association relationship of associated objects, means that there can be three kinds of relationships, for example, A and/or B means that A exists alone, A and B exist at the same time, and B exists alone. The character "/" generally indicates that the associated objects are an "or" relationship. For ease of understanding, some application scenarios involved in the present disclosure are briefly introduced below.

The technical solutions provided by the embodiments of the present disclosure may at least include the following beneficial effects.

After receiving first random access messages Msg. A sent by N terminals, the base station sends second random access messages Msg. B corresponding to the N terminals, where N is an integer greater than or equal to 1. The Msg. B includes respective exclusive information of the N terminals, and the exclusive information includes the type label of the exclusive information of the terminal, in which the type label is configured to indicate the length of the exclusive information of the terminal. With the present disclosure, the type label is added in the Msg. B sent by the base station to the N terminals, and the respective terminals are indicated of the length of the exclusive information to be extracted when extracting the corresponding exclusive information, so that the terminal can correctly divide the received Msg. B, thereby reducing the error rate when the terminal extracts exclusive information, and improving the success rate of random access of the terminal.

Figure 1:
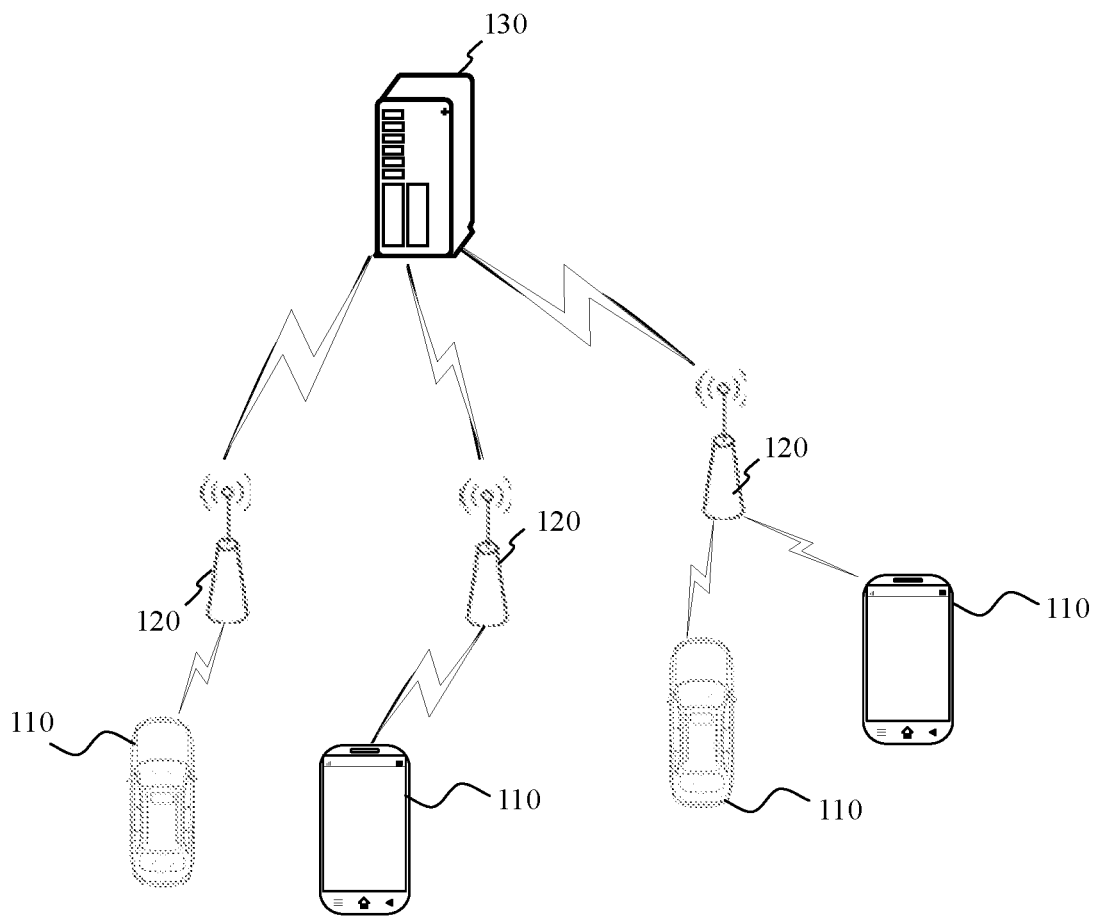
FIG. 1 is a schematic structural diagram of a wireless communication system provided by an embodiment of the present disclosure.

Please refer to FIG. 1, which shows a schematic structural diagram of a wireless communication system provided by an embodiment of the present disclosure. As shown in FIG. 1, the wireless communication system is a communication system based on cellular mobile communication technology, and the wireless communication system may include several terminals 110 and a base station 120.

The terminal 110 may be a device that provides voice and/or data connectivity to a user. The terminal 110 may communicate with one or more core networks via a Radio Access Network (RAN), and the terminal 110 may be an IoT terminal such as a sensor device, a mobile phone (or "cellular" phone) and a computer having an IoT terminal, such as a fixed, portable, pocket, hand-held, built-in computer or a vehicle-mounted device. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle, a vehicle-mounted device, or the like.

The base station 120 may be a network-side device in a wireless communication system. The wireless communication system may also be a 5G system, also known as a new radio (NR) system. Alternatively, the wireless communication system may also be a next-generation system of the 5G system.

Optionally, the base station 120 may be a base station that adopts a centralized distributed architecture (gNB) in a 5G system. When the base station 120 adopts a centralized distributed architecture, it usually includes a central unit (CU) and at least two distributed units (DU). The centralized unit is provided with a protocol stack of a Packet Data Convergence Protocol (PDCP) layer, a Radio Link Control Protocol (RLC) layer, and a Media Access Control (MAC) layer; a physical (PHY) layer protocol stack is set in a distribution unit, and the specific implementation manner of the base station 120 is not limited in embodiments of the present disclosure.

A wireless connection can be established between the base station 120 and the terminal 110 through a wireless air interface. In different embodiments, the wireless air interface is a wireless air interface based on the fifth generation mobile communication network technology (5G) standard, for example, the wireless air interface is a new air interface; or, the wireless air interface can also be an air interface of a next generation of communication network technology standard based on 5G.

Optionally, the above wireless communication system may further include a network management device 130.

The base stations 120 may be connected to the network management devices 130 respectively. The network management device 130 may be a core network device in a wireless communication system. For example, the network management device 130 may be a mobility management entity (MME) in an evolved packet core network (EPC). Alternatively, the network management device may also be other core network devices, such as a serving gateway (SGW), a public data network gateway (PGW), a policy and charging rules function (PCRF) or a home subscriber server (HSS), etc. The implementation form of the network management device 130 is not limited in this embodiment of the present disclosure.

Figure 2:
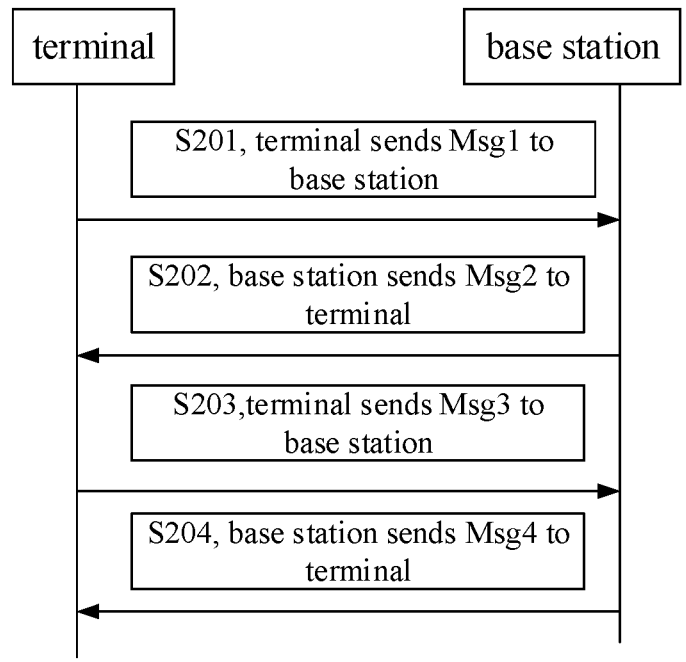
FIG. 2 is a flowchart of a four-step random access involved in an embodiment of the present disclosure.

Optionally, in the above wireless communication system, the terminal 110 may initiate conflict-based random access to the base station 120. Please refer to FIG. 2, which shows a flowchart of a four-step random access involved in an embodiment of the present disclosure. As shown in FIG. 2, the relevant steps of the four-step random access may include followings.

At step 201, a terminal sends Msg1, a random access preamble sequence (Preamble), to a base station.

The terminal sends a random access preamble sequence (Preamble) to the base station, and the base station estimates a transmission delay of the terminal accordingly to realize uplink synchronization.

At step 202, the base station sends Msg2, a random access response (RAR), to the terminal.

The base station sends a timing advance command based on the estimated transmission delay in the above-mentioned first step, so as to adjust a sending time of the terminal. The Msg2 is organized by a Media Access Control (MAC) layer of the base station and carried by a Down Link Share Channel (DL_SCH). One Msg2 can simultaneously respond to random access requests from multiple terminals.

The base station uses PDCCH to schedule Msg2, and performs addressing (also called scrambling) via Cell-Radio Network Temporary Identifier (C-RNTI) or Random Access-Radio Network Temporary Identifier (RA-RNTI), the RA-RNTI is determined through time-frequency resource location of a Physical Random Access Channel (PRACH) that carries Msg1. The Msg2 includes uplink transmission timing advance, and allocates uplink resources and temporary C-RNTI for Msg3.

At step 203, the terminal sends Msg3, a first scheduled transmission, to the base station.

After receiving the Msg2, the terminal transmits the Msg3 on the allocated uplink resources, and sends a User Equipment Identify (UE ID) to the base station through a Physical Uplink Shared Channel (PUSCH).

Optionally, a service data unit (SDU) of a common control channel (CCCH) is included in the Msg3, which is configured for Msg4 carrying a conflict resolution ID.

At step 204, the base station sends Msg4, a conflict resolution message, to the terminal.

The conflict resolution message is sent by the base station to the terminal on the PDSCH.

Figure 3:
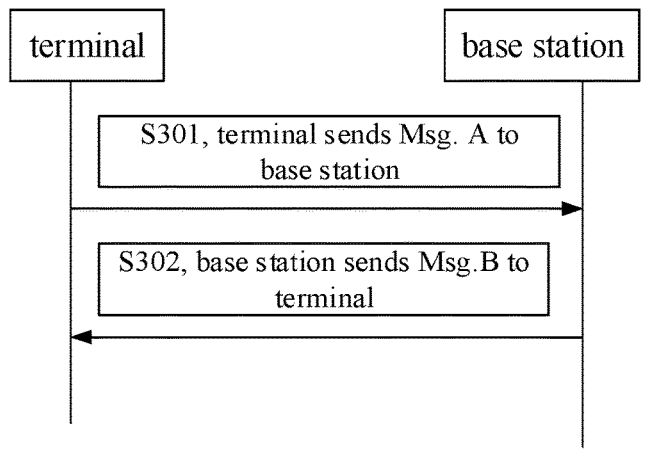
FIG. 3 is a flowchart of a two-step random access involved in the present disclosure.

In order to shorten the time delay of the above random access process and improve the random access efficiency of the terminal, 3GPP proposed a two-step random access mechanism in release 16, i.e., a two-step random access. Please refer to FIG. 3, which shows a flow chart of a two-step random access involved in the present disclosure. As shown in FIG. 3, the relevant steps of the two-step random access may include followings.

At step 301, a terminal sends Msg. A to a base station.

Optional, the Msg. A includes equivalents of Msg1 and Msg3, namely Msg. A includes: a random access preamble sequence and a UE ID, and the UE ID can be one of: C-RNTI, IMSI (International Mobile Subscriber Identity) or a random number generated by a user.

Optionally, the step 301 may consist of step 301a and step 301b.

At step 301a, the terminal may send the selected Preamble on the PRACH resource, and the base station will detect the Preamble on the corresponding PRACH at the same time.

At step 301b, the terminal may also transmit payload information on the PUSCH resource, in which the payload information includes equivalent information of Msg.3, such as UE ID, part of user data, and the like.

When the base station detects the Preamble in step 301a, the base station receives the payload information sent by the terminal on the corresponding PUSCH resource.

At step 302, the base station sends Msg. B to the terminal.

That is, the base station may send the Msg. B when the base station successfully receives the Preamble or payload information in the Msg. A. Optional, Msg. B includes equivalents of Msg2 and Msg4, namely Msg. B includes: a random access response and conflict resolution information. Correspondingly, transmission modes of the Msg. B may correspond to the modes of PDCCH and PDSCH.

Figure 4:
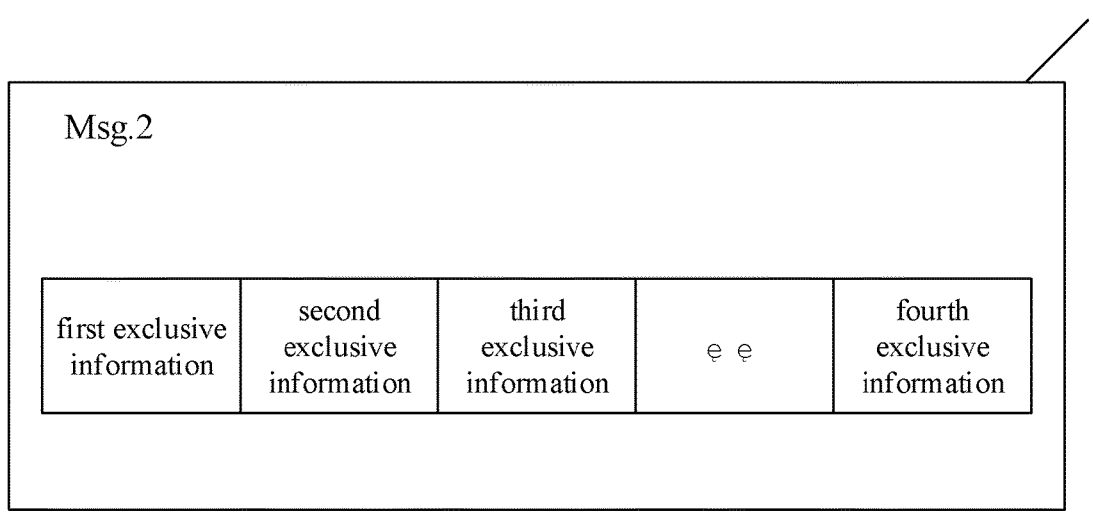
FIG. 4 is a schematic structural diagram of Msg2 returned by a base station to a terminal involved in an embodiment of the present disclosure.
Figure 5:
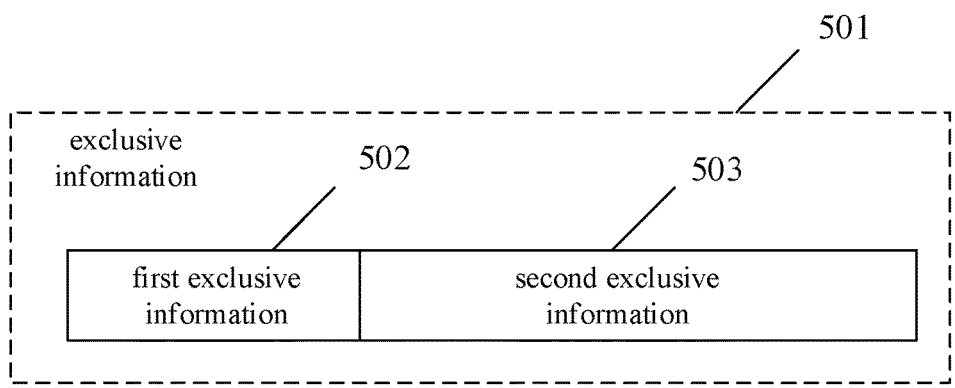
FIG. 5 is a schematic structural diagram of exclusive information shown in FIG. 4 involved in the present disclosure.

Please refer to FIG. 4, which shows a schematic structural diagram of Msg2 returned by a base station to a terminal according to an embodiment of the present disclosure. As shown in FIG. 4, Msg2 401 is included, and the Msg2 401 includes the respective exclusive information of multiple terminals. After receiving the Msg2 returned by the base station, the terminal finds its own exclusive information in Msg2 based on the Preamble sent to the base station in the above step 301a, so as to obtain the corresponding random access response. Please refer to FIG. 5, which shows a schematic structural diagram of exclusive information shown in FIG. 4 involved in the present disclosure. As shown in FIG. 5, the exclusive information 501 includes first exclusive information 502 and second exclusive information 503. The first exclusive information 501 is corresponding to E/T/RAP ID (Extension field/Type field/Random Access Preamble Identifier) information, which is also called a subheader, a Preamble identifier used by the terminal in the random access process is contained in the E/ The T/RAP ID. The second exclusive information 502 corresponds to MAC RAR information, that is, the MAC RAR information includes the random access response returned from the base station to the terminal.

When receiving the Msg2 shown in the above-mentioned FIG. 4 sent by the base station, the terminal can query from first exclusive information in each exclusive information according to the Preamble used by itself, that is, the Preamble identifier used by itself may be compared with the Preamble identifier contained in the first exclusive information in each exclusive information. If the terminal finds that the Preamble identifier in a certain exclusive information is the same as the Preamble identifier of itself, the exclusive information is the exclusive information issued by the base station corresponding to the terminal itself, and the terminal may parse second exclusive information with a fixed length in this exclusive information. If the terminal finds that the Preamble identifier in a certain exclusive information is different from the Preamble identifier of itself, the exclusive information is not the exclusive information issued by the base station corresponding to the terminal itself, and the terminal does not parse the second exclusive information in the exclusive information, and skips a fixed duration of the second exclusive information, the comparison is continued to be performed when the first exclusive information part of the next exclusive information arrives, until the exclusive information belonging to the terminal itself is found.

For the two-step random access mechanism proposed above, the exclusive information of multiple terminals may be carried in the Msg. B according to the structure shown in FIG. 4, so that the terminal can extract its own exclusive information. However, for the two-step random access mechanism, sizes of the exclusive information of the respective terminals carried in Msg. B are not fixed, that is, the sizes of the exclusive information of multiple terminals may be different. For example, in the exclusive information in Msg. B sent to a first terminal, the second exclusive information is a conflict resolution message of the first terminal, while in the exclusive information in Msg. B sent to a second terminal, the corresponding second exclusive information is a reassignment resource message containing PUSCH in the Msg. A of the second terminal, and the sizes of these two kinds of information are not the same. At this time, a waiting time of the third terminal comparing with the exclusive information of the first terminal in the Msg. B is different from a waiting time of the third terminal comparing with the exclusive information of the second terminal in the Msg. B. If a fixed length in the above scheme is used for skipping or parsing, the third terminal may make errors on parsing or skipping, that is, the terminal cannot correctly divide the length of the second exclusive information in the exclusive information, resulting in random access failure.

In order to correctly divide the Msg. B received by the target terminal to improve the success rate of random access of the target terminal, the present disclosure provides a random access message transmission method. Please refer to FIG. 6, which shows a method flowchart of a random access message transmission method provided by an embodiment of the present disclosure. As shown in FIG. 6, the random access message transmission method may be implemented using the wireless communication system shown in FIG. 1 and may be executed by the base station in the system, the method may include the following steps.

At step 601, a second random access message Msg. B corresponding to N terminals is received after receiving first random access messages Msg. A sent by the N terminals, where N is an integer greater than or equal to 1.

The Msg. B includes respective exclusive information of the N terminals; exclusive information includes a type label of the exclusive information of a terminal; the type label is configured to indicate a length of the exclusive information of the terminal.

Optionally, the exclusive information includes a subheader and exclusive sub-information, the type label is located in the subheader, or, the type label is in the exclusive sub-information.

Optionally, the above subheader includes a random preamble identifier RAP ID; and the type label occupies M bits in the subheader when the type label is located in the subheader, where 1≤M<6, and the RAP ID occupies 6−M bits in the subheader.

Optional, exclusive information of a target terminal in the Msg. B is filled with numbers when a length of the exclusive information of the target terminal in the Msg. B is a first length and the first length is different from a second length, and a filling length of the numbers is a difference between the first length and the second length; and the target terminal is one of the N terminals, and the second length is the longest length in the respective exclusive information corresponding to the N terminals.

Optionally, the above exclusive sub-information further includes at least one of a random access response, a network connection establishment parameter, and a random access conflict resolution response; and the type label is configured to indicate a type of the exclusive information.

In conclusion, the base station sends a second random access message Msg. B corresponding to N terminals after receiving first random access messages Msg. A sent by the N terminals, where N is an integer greater than or equal to 1. The Msg. B includes respective exclusive information of the N terminals; exclusive information includes a type label of the exclusive information of a terminal; the type label is configured to indicate a length of the exclusive information of the terminal. With the present disclosure, the type label is added in the Msg. B sent by the base station to the N terminals, and the respective terminals are indicated of the length of the exclusive information to be extracted when extracting the corresponding exclusive information, so that the terminal can correctly divide the received Msg. B, thereby reducing the error rate when the terminal extracts exclusive information, and improving the success rate of random access of the terminal.

Please refer to FIG. 7, which shows a method flowchart of a random access message transmission method provided by an embodiment of the present disclosure. The method can be implemented using the wireless communication system shown in FIG. 1 and may be executed by a target terminal in this system. As shown in FIG. 7, the method may include the following steps.

At step 701, a first random access message Msg. A is sent to a base station.

At step 702, a second random access message Msg. B sent by the base station is received.

The Msg. B includes respective exclusive information of N terminals, the N terminals include the target terminal, where N is an integer greater than or equal to 1; the exclusive information includes a type label of the exclusive information of a terminal; the type label is configured to indicate a length of the exclusive information of the terminal.

At step 703, a type label in an i-th exclusive information in the Msg. B is extracted in response to determining the i-th exclusive information is exclusive information of the target terminal, where 1≤i≤N, and i is an integer.

At step 704, the exclusive information of the target terminal is extracted from Msg. B based on a length indicated by a type label in the i-th exclusive information.

Optionally, the above exclusive information further includes a subheader and exclusive sub-information; and the type label is located in the subheader; or, the type label is in the exclusive sub-information.

Optionally, the above subheader includes a random preamble identifier RAP ID; and the type label occupies M bits in the subheader when the type label is located in the subheader, where 1≤M<6, and the RAP ID occupies 6−M bits in the subheader.

Optional, exclusive information of a target terminal in the Msg. B is filled with numbers when a length of the exclusive information of the target terminal in the Msg. B is a first length and the first length is different from a second length, and a filling length of the numbers is a difference between the first length and the second length; and the second length is the longest length in the respective exclusive information corresponding to the N terminals.

Optionally, the method further includes: skipping information of the second length and parsing (i+1)-th exclusive information in response to determining that i-th exclusive information parsed from the Msg. B is not the exclusive information of the target terminal, where i is not equal to N.

Optionally, the method further includes: skipping information on a length indicated by a type label in i-th exclusive information parsed from the Msg. B and parsing (i+1)-th exclusive information in response to determining that the i-th exclusive information is not the exclusive information of the target terminal, where i is not equal to N.

Optionally, the exclusive sub-information further includes at least one of a random access response, a network connection establishment parameter, and a random access conflict resolution response of a terminal; and the type label is configured to indicate a type of the exclusive information.

In conclusion, the base station sends a second random access message Msg. B corresponding to N terminals after receiving first random access messages Msg. A sent by the N terminals, where N is an integer greater than or equal to 1. The Msg. B includes respective exclusive information of the N terminals; exclusive information includes a type label of the exclusive information of a terminal; the type label is configured to indicate a length of the exclusive information of the terminal. With the present disclosure, the type label is added in the Msg. B sent by the base station to the N terminals, and the respective terminals are indicated of the length of the exclusive information to be extracted when extracting the corresponding exclusive information, so that the terminal can correctly divide the received Msg. B, thereby reducing the error rate when the terminal extracts exclusive information, and improving the success rate of random access of the terminal.

Figure 8:
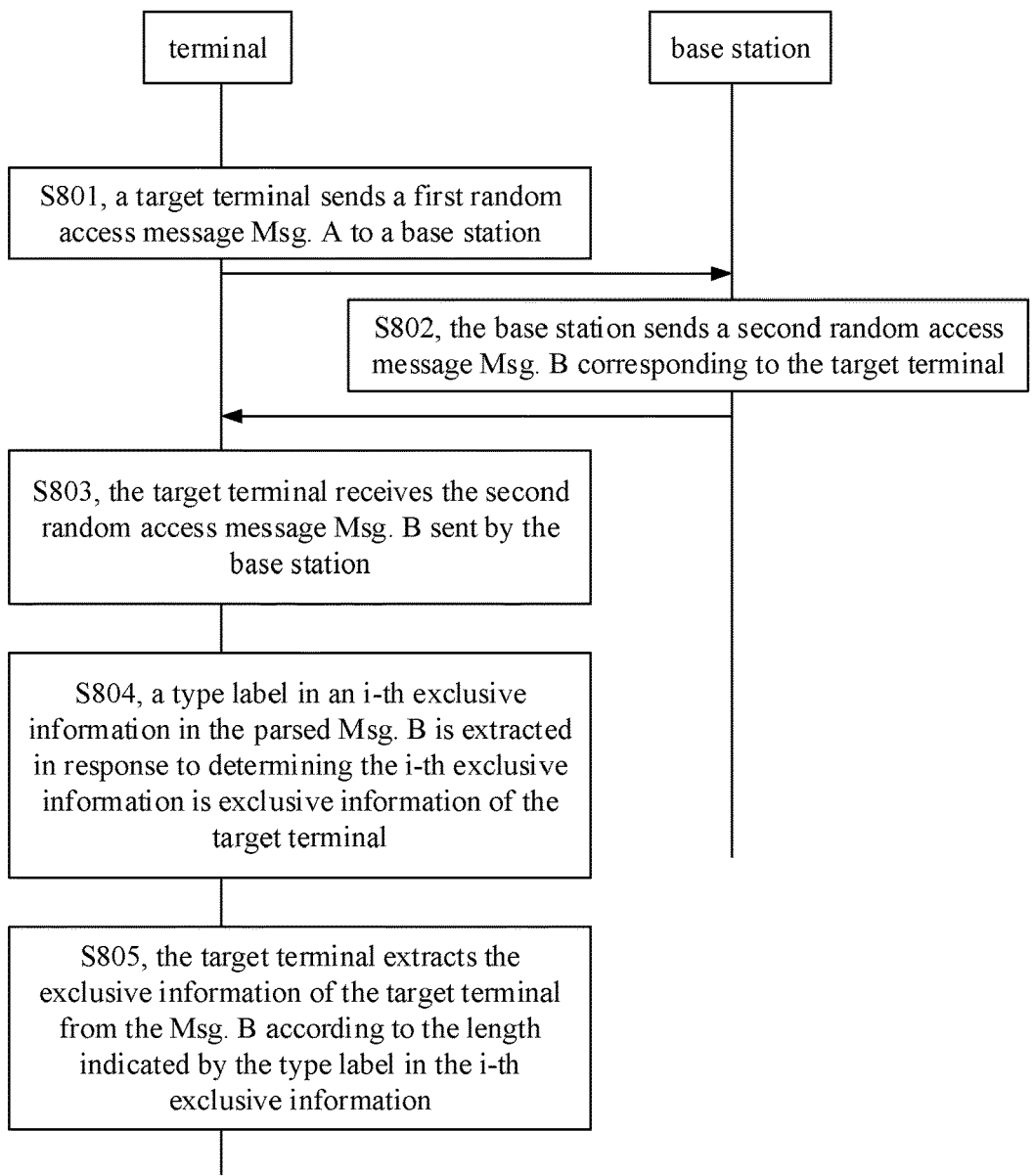
FIG. 8 is a method flowchart of a random access message transmission method provided by an embodiment of the present disclosure.

The random access message transmission methods shown in FIG. 6 and FIG. 7 will be described below based on an interaction between the base station and the target terminal. Please refer to FIG. 8, which shows a method flowchart of a random access message transmission method provided by an embodiment of the present disclosure. As shown in FIG. 8, the random access message transmission method can be implemented using the wireless communication system shown in FIG. 1, and may be executed by a base station and a target terminal in the system, the method may include the following steps.

At step 801, a target terminal sends a first random access message Msg. A to a base station.

Correspondingly, the base station receives the Msg. A sent by the target terminal.

The manner of the target terminal sending the Msg. A to the base station may be refer to the descriptions of step 301 in FIG. 3, that is, the Msg. A may include a random access preamble sequence (Preamble) and a PUSCH, and the target terminal may send the Preamble via the PRACH, and send payload information via the PUSCH, and the like, which will not be elaborated herein.

At step 802, the base station sends a second random access message Msg. B corresponding to the target terminal.

In the random access procedure, after receiving the Msg. A sent by the target terminal, the base station will actively return Msg. B to the target terminal, so that the random access procedure of the target terminal continues to proceed. If there are other terminals using Preambles different from that used by the target terminal send Msg. A to the same base station at the same time, the base station will receive the Msg. A sent by other terminals while receiving the Msg. A sent by the target terminal. That is, the base station can receive Msgs. A sent respectively by terminals including the target terminal at the same time. The base station may return the Msg. B to these terminals at the same time after receiving the Msgs. A sent respectively by the target terminal and other terminals. Of course, if the base station only receives the Msg. A sent by the target terminal, the Msg. B returned by the base station is only for the target terminal.

Optionally, taking the base station receiving Msgs. A from multiple terminals including the target terminal in this step as an example, the base station may send Msg. B to the multiple terminals including the target terminal. Correspondingly, the target terminal may receive the Msg. B which is sent from the base station to the multiple terminals. That is, after receiving the Msg. A sent by N terminals, the base station may send the Msg. B corresponding to the N terminals to the N terminals. The target terminal is included in the N terminals.

At step 803, the target terminal receives the second random access message Msg. B sent by the base station.

Optional, the Msg. B includes respective exclusive information of the N terminals; exclusive information includes a type label of the exclusive information of a terminal; the type label is configured to indicate a length of the exclusive information of the terminal.

Figure 9:
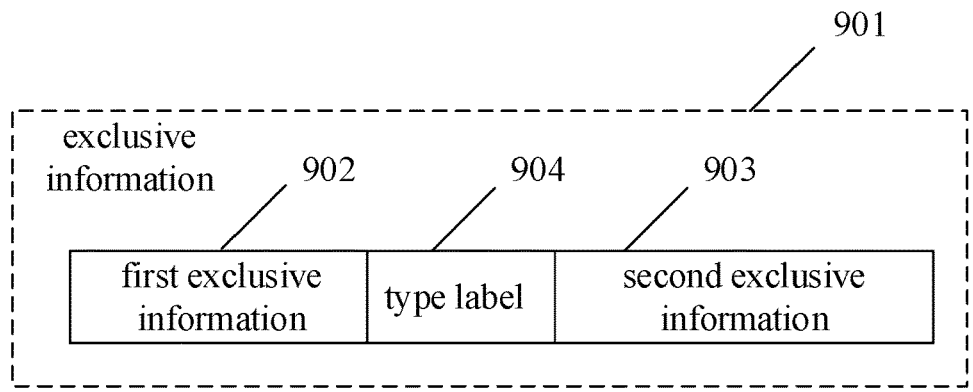
FIG. 9 is a schematic structural diagram of exclusive information involved in an embodiment of the present disclosure.

As shown in FIGS. 4 and 5 above, the Msg. B sent by the base station may include the respective exclusive information of the N terminals, and the respective exclusive information of the N terminals includes the respective second exclusive information of the N terminals. The difference from the above FIG. 4 and FIG. 5 is that the respective exclusive information of the N terminals in the Msg. B provided by the embodiment of the present disclosure also includes a type label of the exclusive information corresponding to the respective terminals, and the second exclusive information included in the Msg. B of the embodiment of the present disclosure may be at least one of a random access responses, a network connection establishment parameter, and a random access conflict resolution responses of the N terminals respectively. That is, in the embodiment of the present disclosure, the exclusive information further includes a subheader and exclusive sub-information (i.e., the second exclusive information). Optionally, the exclusive information further includes at least one of a random access response, a network connection establishment parameter, and a random access conflict resolution response of the corresponding terminal. Please refer to FIG. 9, which shows a schematic structural diagram of exclusive information involved in an embodiment of the present disclosure. As shown in FIG. 9, the exclusive information 901 includes first exclusive information 902, second exclusive information 903, and a type label 904. The first exclusive information 902 and the second exclusive information 903 are corresponding to E/T/RAP ID information and MAC RAR information respectively, and the type label 904 may indicate a length of MAC RAR information. For example, when the length of the MAC RAR information is 8 bits, the type label 904 may indicate that the length of the corresponding MAC RAR information is 8 bits. The second exclusive information included in the Msg. B shown in FIG. 9 is the random access response corresponding to the respective N terminals. Correspondingly, the type label of the exclusive information may be the type label of the random access response.

Figure 10:
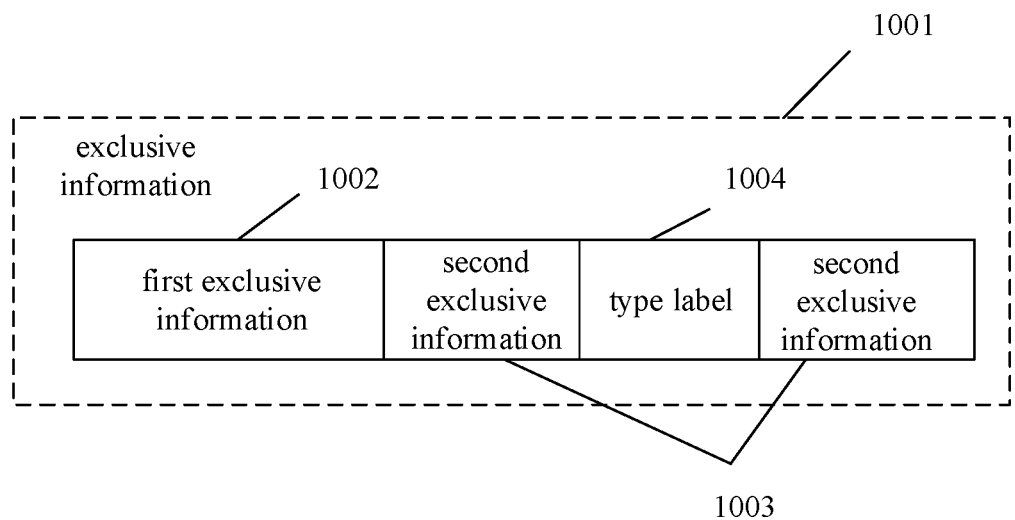
FIG. 10 is a schematic structural diagram of exclusive information involved in an embodiment of the present disclosure.

In a possible implementation, the type label is in the exclusive sub-information. That is, the type label is in an information field of the second specific information. Please refer to FIG. 10, which shows a schematic structural diagram of exclusive information involved in an embodiment of the present disclosure. As shown in FIG. 10, the exclusive information 1001 includes first exclusive information 1002, second exclusive information 1003, a type label 1004. The location of the type label 1004 may be as shown in FIG. 10, that is, in the exclusive information. In the Msg. B sent by the base station, the type labels included in the exclusive information of the respective terminals can be added in the information field of the second exclusive information. Optionally, the location of the type label 1004 may be any location in the information field of the second exclusive information. Optionally, in practical applications, the location of the type label 1004 may be agreed in advance by the base station and the terminal.

For example, the information field of the second exclusive information included in the exclusive information corresponding to the target terminal in Msg. B has 10 bits, and the base station may add the above type label at the first bit, the second bit, the tenth bit and the like in the information field of the second exclusive information. If the base station and the target terminal agree in advance to use the third bit in the information field of the second exclusive information, the base station can add the type label corresponding to the target terminal to the third bit.

Figure 11:
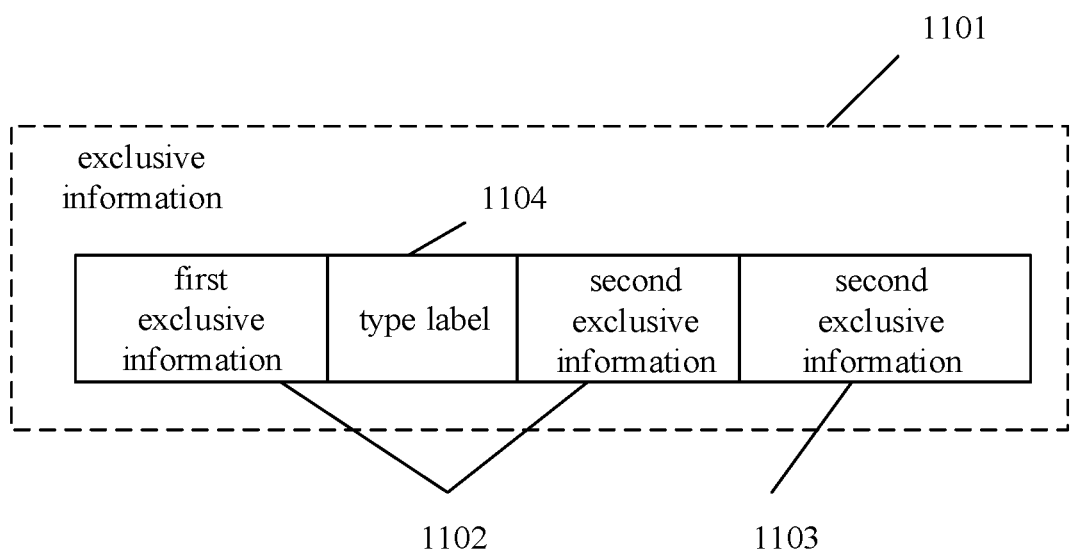
FIG. 11 is a schematic structural diagram of exclusive information involved in an embodiment of the present disclosure.

In a possible implementation, the type label is located in the subheader. That is, the type label is in the information field of the first exclusive information. Please refer to FIG. 11, which shows a schematic structural diagram of exclusive information involved in an embodiment of the present disclosure. As shown in FIG. 11, exclusive information 1101 includes first exclusive information 1102, second exclusive information 1103, and a type label 1104. The location of the type label 1104 may be as shown in FIG. 11, that is, in the first exclusive information. In the Msg. B sent by the base station, the type labels included in the exclusive information of the respective terminals can be added in the information field of the first exclusive information. Optionally, the location of the type label 1104 may be any location in the information field of the first exclusive information. Optionally, in practical applications, the location of the type label 1104 may be agreed in advance by the base station and the terminal.

For example, the information field of the first exclusive information included in the exclusive information corresponding to the target terminal in Msg. B has 8 bits, and the base station may add the above type label at the first bit, the second bit, the eighth bit and the like in the information field of the first exclusive information. If the base station and the target terminal agree in advance to use the eighth bit in the information field of the first exclusive information, the base station can add the type label corresponding to the target terminal to the eighth bit.

As can be seen from the above content, the subheader contains a random preamble identifier RAP ID. Optionally, when the type label is located in the subheader, the type label occupies M bits in the subheader, 1≤M<6, and the RAP ID occupies 6−M bits in the subheader. For example, the type label occupies 1 bit in the header, and the RAP ID occupies 5 bits in the header. The fixed 8-bit information field in the subheader has been fully occupied by E/T/RAPID. That is, in the E/T/RAPID, E indicates whether the second exclusive information of the exclusive information has a corresponding MAC subheader (1 indicates that there is another MAC subheader, 0 means that there is no MAC subheader); T indicates whether the MAC subheader is followed by BI (Backoff Indicator) or RAP ID (that is, the Preamble identifier reported by the UE). T=1 indicates that the RAP ID is carried subsequent to the current MAC subheader, and T=0 indicates that the BI (Backoff Indicator) is carried subsequent to the current MAC subheader. R and T occupy 1 bit respectively. When RAP ID occupies 6 bits, all 8 bits of the subheader are occupied. In order to add the type label to the 8 bits, the 6 bits occupied by the RAP ID can be changed to 5 bits.

For example, in a possible implementation manner, the Preamble identifier that can be represented by the base station ranges from 0 to 31, that is, the base station compresses the 6 bits of the Preamble identifier ranging from 0 to 63 to 5 bits, and the base station can also use 5 bits to represent the RAP ID contained in the subheader. Please refer to Table 1, which shows a correspondences of Preamble identifiers represented by 5 bit information of a base station involved in an embodiment of the present disclosure.

TABLE 1

| 00000 | Preamble identifier 0 |
| 00001 | Preamble identifier 1 |
| 00010 | Preamble identifier 2 |
| ... | ... |
| 11110 | Preamble identifier 30 |
| 11111 | Preamble identifier 31 |

Similarly, the base station can also indicate a smaller range of Preamble identifiers, so that the RAP ID occupies fewer bits (such as 4 bit, 3 bit, etc.) in the subheader, and the type label can also be added to the information field in the subheader. The specific range of the Preamble identifiers that the base station can represent is not limited in the present disclosure.

In a possible implementation, the base station may unify the lengths of the exclusive information corresponding to the respective terminal in the Msg. B before sending the Msg. B. The exclusive information of the target terminal in the Msg. B is filled with numbers when a length of the exclusive information of the target terminal in the Msg. B is a first length and the first length is different from a second length, and a filling length of the numbers is a difference between the first length and the second length; and the second length is the longest length in the respective exclusive information corresponding to the N terminals.

Figure 12:
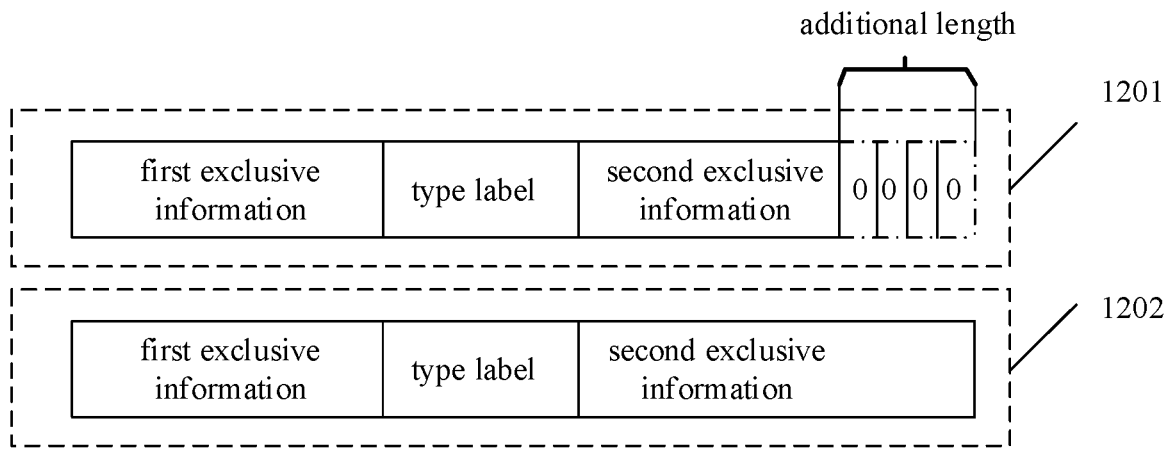
FIG. 12 is a schematic structural diagram of a digital-filled exclusive information involved in an embodiment of the present disclosure.

For example, when the length of the exclusive information of the target terminal is different from the length of the longest exclusive information in the Msg. B, the base station may fill numbers subsequent to the second exclusive information of the corresponding target terminal, so that the length of the exclusive information of the target terminal is the same as the length of the longest exclusive information in Msg. B. Please refer to FIG. 12, which shows a schematic structural diagram of a digital-filled exclusive information involved in an embodiment of the present disclosure. As shown in FIG. 12, exclusive information 1201 of the target terminal and the longest exclusive information 1202 are included. The base station may fill the exclusive information in the exclusive information 1201 of the target terminal before sending Msg. B, so that the length of the second exclusive information in the exclusive information 1201 of the target terminal is the same as the length of the second exclusive information in the longest exclusive information 1202.

Figure 13:
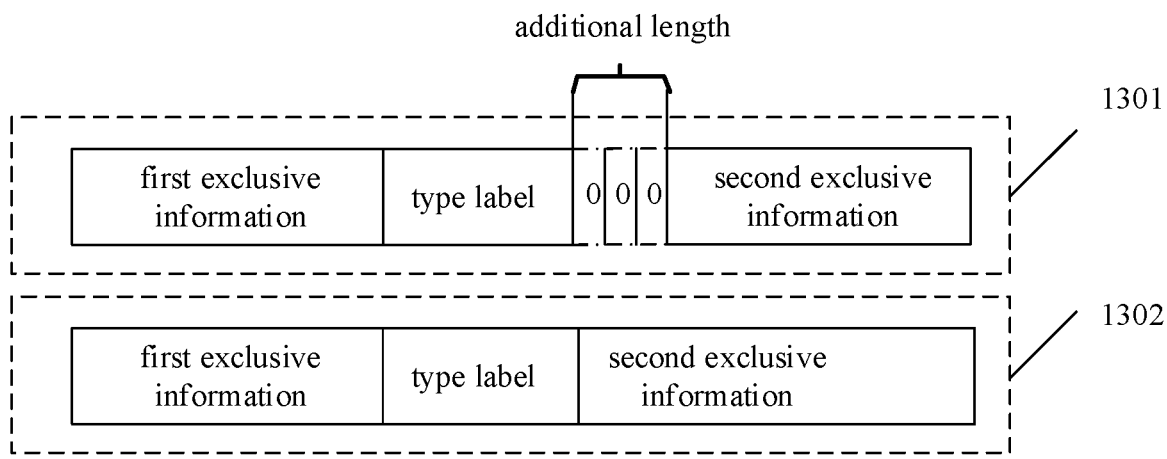
FIG. 13 is a schematic diagram of a filling method related to FIG. 12 according to an embodiment of the present disclosure.
Figure 14:
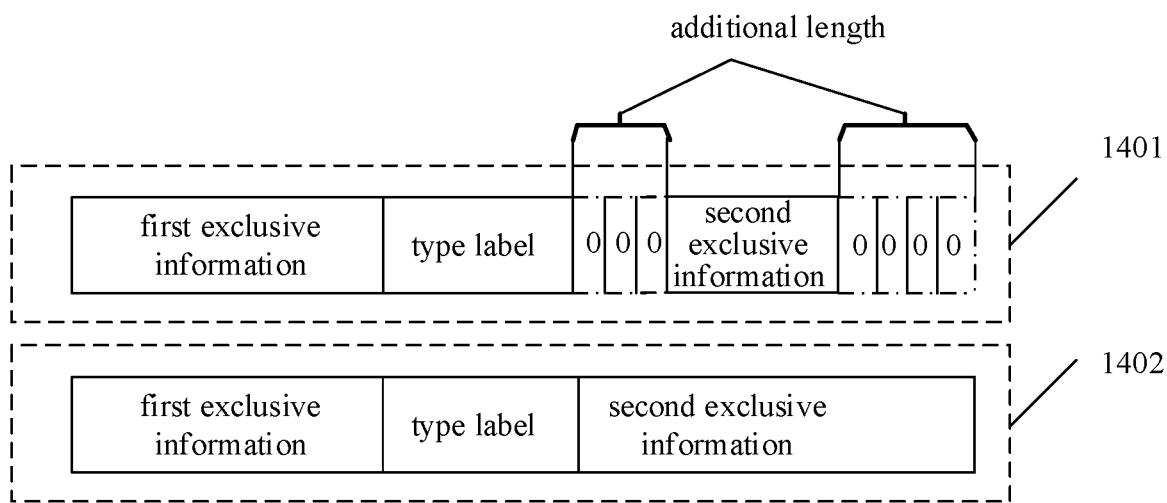
FIG. 14 is a schematic diagram of a filling method related to FIG. 12 according to an embodiment of the present disclosure.

As shown in FIG. 12, for example, the number 0 is filled subsequent to the second exclusive information corresponding to the target terminal in the Msg. B. In practical applications, the base station may also fill in other numbers (for example, 1). In addition, the base station may also fill numbers prior to the second exclusive information corresponding to the target terminal in the Msg. B. Alternatively, the base station may fill numbers prior to or subsequent to the second exclusive information corresponding to the target terminal in the Msg. B at the same time. Please refer to FIG. 13 to FIG. 14, which show schematic diagrams of the other two filling methods related to FIG. 12 according to an embodiment of the present disclosure. As shown in FIG. 13, exclusive information 1301 of the target terminal and the longest exclusive information 1302 are included. The base station may fill numbers between the second exclusive information and the subheader in the exclusive information 1301 of the target terminal before sending the Msg. B, so that the length of the second exclusive information in the exclusive information 1301 of the target terminal is the same as the length of the second exclusive information in the longest exclusive information 1302. As shown in FIG. 14, exclusive information 1401 of the target terminal and the longest exclusive information 1402 are included. The base station may fill numbers between the second exclusive information and the subheader in the exclusive information 1401 of the target terminal, and fill numbers subsequent to the second exclusive information, so that the length of the second exclusive information in the exclusive information 1401 of the target terminal is same as the length of the second exclusive information in the longest exclusive information 1402, which is not limited in the embodiment of the present disclosure.

Optionally, the above type label may also be used to indicate the type of the corresponding exclusive information. For example, the Msg. B sent by the base station includes two types of exclusive information corresponding to N terminals: Type 1 and Type 2. Type 1 may be a feedback from the base station to the terminal when the base station successfully receives the Preamble identifier and Payload (PUSCH) information sent by the terminal, that is, in the first step of random access, the base station successfully receives the Msg. A sent by the terminal. At this time, the exclusive information may include the TA of the terminal, RRC (Radio Resource Control) connection establishment related information, and the RNTI of the terminal. Type 2 may be a feedback from the base station to the terminal when the base station only successfully receives the Preamble identifier but fails to receive the payload (PUSCH) information. At this time, the exclusive information may include the content included in the traditional RAR. For example, the TA of the terminal, the RNTI of the terminal and the scheduling information of the subsequent Msg.3. The sizes of the exclusive information corresponding to the two response types are different. Please refer to Table 2, which shows a correspondence table between a type of exclusive information involved in an embodiment of the present disclosure and a length of the exclusive information.

TABLE 2

| Type of exclusive information | Length of exclusive information |
|---|---|
| Type 1 | Length 1 |
| Type 2 | Length 2 |
| Type 3 | Length 3 |
| ... | ... |

As shown in Table 2, the response types of different exclusive information may correspond to different lengths of exclusive information. If the target terminal and the base station can share the same Table 2 above, the type label in the embodiment of the present disclosure indicates the response type of the exclusive information or the length of the exclusive information, or indirectly indicates the length of the exclusive information, that is, the target terminal can also obtain the length of the corresponding exclusive information according to the above Table 2 through the response type indicated by the type label.

At step 804, a type label in an i-th exclusive information in the parsed Msg. B is extracted in response to determining the i-th exclusive information is exclusive information of the target terminal, where $1 \le i \le N$, and i is an integer.

The target terminal compares the RAP ID in each subheader according to the Preamble identifier used by itself, so as to know which exclusive information belongs to itself. If the Preamble identifier used by the target terminal is the same as the RAP ID in a certain subheader, it means that the exclusive information belongs to the target terminal. If the Preamble identifier used by the target terminal is different from the RAP ID in a certain subheader, it means that the exclusive information does not belong to the target terminal. That is, the target terminal may determine whether the i-th exclusive information is its own exclusive information by parsing the subheader in the i-th exclusive information.

Optionally, the target terminal may start to parse from the first exclusive information contained in the Msg. B after receiving the Msg. B. When the target terminal finds out that the RAP ID contained in the subheader of the i-th exclusive information is the same as its own Preamble identifier by parsing the i-th exclusive information in the Msg. B ($1 \le i \le N$, and i is an integer), the target terminal may extract the type label in the i-th exclusive information. That is, the type label in the i-th exclusive information is obtained.

Figure 15:
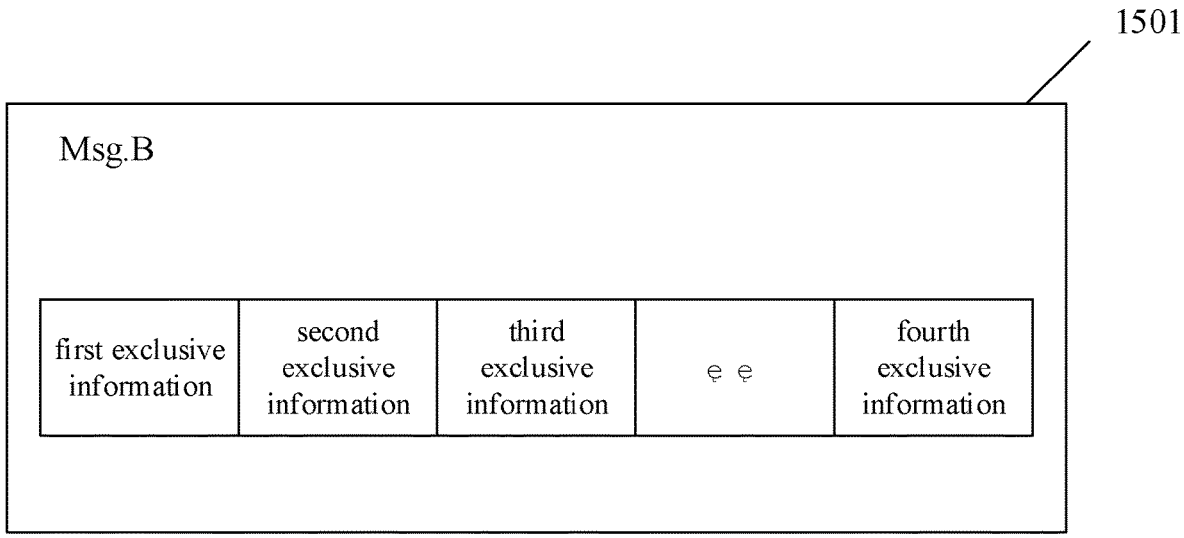
FIG. 15 is a schematic diagram of Msg. B involved in an embodiment of the present disclosure.

For example, please refer to FIG. 15, which shows a schematic diagram of Msg. B involved in an embodiment of the present disclosure. As shown in FIG. 15, Msg. B 1501 contains the respective exclusive information of N terminals including the target terminal. Assuming that the third exclusive information is the exclusive information of the target terminal, the target terminal finds out that the third exclusive information is its own exclusive information by parsing the third exclusive information in the Msg. B, the target terminal may extract the type label in the third exclusive information.

At step 805, the target terminal extracts the exclusive information of the target terminal from the Msg. B according to the length indicated by the type label in the i-th exclusive information.

Since the type label can indicate the length of the exclusive information in the exclusive information, when the target terminal obtains that the i-th exclusive information is its own exclusive information, the target terminal may know the length of the subsequent exclusive information from the extracted type label. When extracting exclusive information, bits of the corresponding length may be intercepted for extraction. For example, taking the third exclusive information of the above-mentioned FIG. 15 being the exclusive information of the target terminal as an example, the type label of the third exclusive information indicates that the length of the exclusive information is 14 bits. After obtaining the type label of the third exclusive information, the target terminal may know that the 14-bit information subsequent to the first exclusive information is the information length corresponding to its own exclusive information, and the target terminal extracts the exclusive information of the target terminal from the third exclusive information according to the 14-bit length.

In a possible implementation, in the above step 804, the target terminal skips information on a length indicated by a type label in i-th exclusive information parsed from the Msg. B and parses (i+1)-th exclusive information in response to determining that the i-th exclusive information is not the exclusive information of the target terminal, where i is not equal to N.

That is, when the i-th exclusive information is not the exclusive information of the target terminal, the target terminal may also obtain the type label in the i-th exclusive information, skip the i-th exclusive information according to the length indicated by the type label in the i-th exclusive information exclusive information, and parse the i+1 exclusive information. Since the length indicated by the type label is exactly the length of the i-th exclusive information, the target terminal may directly skip the corresponding length without parsing the i-th exclusive information. Taking the above FIG. 15 as an example again, if the target terminal parses and determines that the first exclusive information (exclusive information 1) is not the exclusive information of the target terminal, the target terminal can also obtain the type label in the exclusive information 1, skip the length of the exclusive information 1 according to the length indicated by the type label in the exclusive information 1, and directly parse the second exclusive information (exclusive information 2).

Optionally, corresponding to the examples shown in FIG. 12 to FIG. 14 above, in the above step 804, when it is determined that the i-th exclusive information in the Msg. B (i is not equal to N) is not the exclusive information of the target terminal after parsing, the information of the second length is skipped, and the (i+1)-th exclusive information is parsed. Optionally, the second length may be obtained by the target terminal parsing the type label in the i-th exclusive information. Optionally, in the embodiments of FIG. 12 to FIG. 14, since the length of the respective exclusive information has been filled by the base station, for the respective exclusive information corresponding to the Msg. B, the base station may only add a type label to the first exclusive information. After parsing the subheaders of the respective exclusive information, the terminal skips according to the length indicated by the added type label in the first exclusive information.

In conclusion, the base station sends a second random access message Msg. B corresponding to N terminals after receiving first random access messages Msg. A sent by the N terminals, where N is an integer greater than or equal to 1. The Msg. B includes respective exclusive information of the N terminals; exclusive information includes a type label of the exclusive information of a terminal; the type label is configured to indicate a length of the exclusive information of the terminal. With the present disclosure, the type label is added in the Msg. B sent by the base station to the N terminals, and the respective terminals are indicated of the length of the exclusive information to be extracted when extracting the corresponding exclusive information, so that the terminal can correctly divide the received Msg. B, thereby reducing the error rate when the terminal extracts exclusive information, and improving the success rate of random access of the terminal.

Apparatus embodiments of the present disclosure will be described below, which can be used to execute the method embodiments of the present disclosure. For details not disclosed in the apparatus embodiments of the present disclosure, please refer to the method embodiments of the present disclosure.

Figure 16:
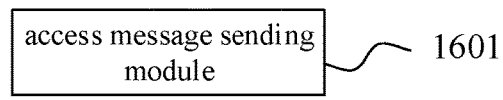
FIG. 16 is a block diagram of a random access message transmission apparatus according to an exemplary embodiment.

FIG. 16 is a block diagram of a random access message transmission apparatus according to an exemplary embodiment. As shown in FIG. 16, the random access message transmission apparatus may be implemented as all or a part of the base station in the implementation environment shown in FIG. 1 through hardware or a combination of software and hardware, to perform the steps performed by the base station in any of the embodiments shown in FIG. 6 or FIG. 8. The random access message transmission apparatus may include: an access message sending module 1601, configured to send a second random access message Msg. B corresponding to N terminals after receiving first random access messages Msg. A sent by the N terminals, where N is an integer greater than or equal to 1; in which, the Msg. B includes respective exclusive information of the N terminals; exclusive information includes a type label of the exclusive information of a terminal; the type label is configured to indicate a length of the exclusive information of the terminal.

Optionally, the exclusive information further includes a subheader and exclusive sub-information; and the type label is located in the subheader; or, the type label is in the exclusive sub-information.

Optionally, the subheader includes a random preamble identifier RAP ID; and the type label occupies M bits in the subheader when the type label is located in the subheader, where $1 \leq M < 6$, and the RAP ID occupies 6−M bits in the subheader.

Optionally, exclusive information of a target terminal in the Msg. B is filled with numbers when a length of the exclusive information of the target terminal in the Msg. B is a first length and the first length is different from a second length, and a filling length of the numbers is a difference between the first length and the second length; and the target terminal is one of the N terminals, and the second length is the longest length in the respective exclusive information corresponding to the N terminals.

Optionally, the exclusive sub-information further includes at least one of a random access response, a network connection establishment parameter, and a random access conflict resolution response; and the type label is configured to indicate a type of the exclusive information.

Figure 17:
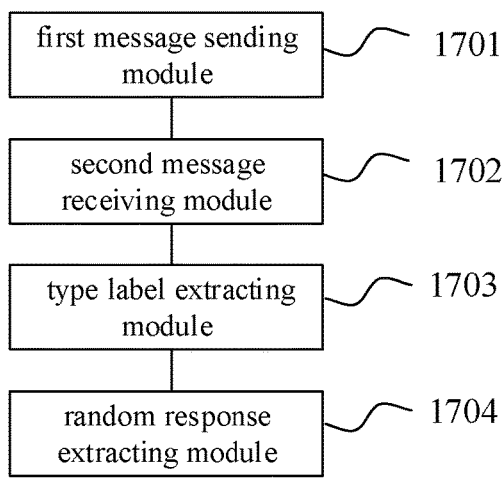
FIG. 17 is a block diagram of a random access message transmission apparatus according to an exemplary embodiment.

FIG. 17 is a block diagram showing a random access message transmission apparatus according to an exemplary embodiment. As shown in FIG. 17, the random access message transmission apparatus may be implemented as all or a part of the target terminal in the implementation environment shown in FIG. 1 through hardware or a combination of software and hardware, to perform the steps performed by the base station in any of the embodiments shown in FIG. 7 or FIG. 8. The random access message transmission apparatus may include: a first message sending module 1701, configured to send a first random access message Msg. A to a base station; a second message receiving module 1702, configured to receive a second random access message Msg. B sent by the base station; in which the Msg. B includes respective exclusive information of N terminals, the N terminals include the target terminal, where N is an integer greater than or equal to 1; the exclusive information includes a type label of the exclusive information of a terminal; the type label is configured to indicate a length of the exclusive information of the terminal; a type label extracting module 1703, configured to extract a type label in an i-th exclusive information in the Msg. B in response to determining the i-th exclusive information is exclusive information of the target terminal, where $1 \leq i \leq N$, and i is an integer; and a random response extracting module 1704, configured to extract the exclusive information of the target terminal from Msg. B based on a length indicated by a type label in the i-th exclusive information.

Optionally, the exclusive information further includes a subheader and exclusive sub-information; and the type label is located in the subheader; or, the type label is in the exclusive sub-information.

Optionally, the subheader includes a random preamble identifier RAP ID; and the type label occupies M bits in the subheader when the type label is located in the subheader, where $1 \leq M < 6$, and the RAP ID occupies 6−M bits in the subheader.

Optionally, exclusive information of the target terminal in the Msg. B is filled with numbers when a length of the exclusive information of the target terminal in the Msg. B is a first length and the first length is different from a second length, and a filling length of the numbers is a difference between the first length and the second length; and the second length is the longest length in the respective exclusive information corresponding to the N terminals.

Optionally, the apparatus further includes: a first skipping module, configured to skip information of the second length and parsing (i+1)-th exclusive information in response to determining that i-th exclusive information parsed from the Msg. B is not the exclusive information of the target terminal, where i is not equal to N.

Optionally, the apparatus further includes: a second skipping module, configured to skip information on a length indicated by a type label in i-th exclusive information parsed from the Msg. B and parsing (i+1)-th exclusive information in response to determining that the i-th exclusive information is not the exclusive information of the target terminal, where i is not equal to N.

Optionally, the exclusive sub-information further includes at least one of a random access response, a network connection establishment parameter, and a random access conflict resolution response of a terminal; and the type label is configured to indicate a type of the exclusive information.

It should be noted that, when the apparatus provided in the above embodiment realizes its functions, the division of the above functional modules is only used as an example for illustration. In practical applications, the above functions can be allocated to different functional modules according to actual needs. That is, the content structure of the apparatus is divided into different functional modules to complete all or part of the functions described above.

The specific manner of each module performing operations in the above apparatus embodiments has been described in detail in the method embodiments, which will not be described in detail herein.

An exemplary embodiment of the present disclosure provides a random access message transmission apparatus, which can implement all or a part of the steps performed by the base station in the above-mentioned embodiment shown in FIG. 7 or FIG. 8 of the present disclosure. The random access message transmission apparatus includes: a processor, a memory for storing processor executable instructions; the processor is configured to: send a second random access message Msg. B corresponding to N terminals after receiving first random access messages Msg. A sent by the N terminals, where N is an integer greater than or equal to 1; in which, the Msg. B includes respective exclusive information of the N terminals; exclusive information includes a type label of the exclusive information of a terminal; the type label is configured to indicate a length of the exclusive information of the terminal.

Optionally, the exclusive information further includes a subheader and exclusive sub-information; and the type label is located in the subheader; or, the type label is in the exclusive sub-information.

Optionally, the subheader includes a random preamble identifier RAP ID; and the type label occupies M bits in the subheader when the type label is located in the subheader, where 1≤M<6, and the RAP ID occupies 6−M bits in the subheader.

Optionally, exclusive information of a target terminal in the Msg. B is filled with numbers when a length of the exclusive information of the target terminal in the Msg. B is a first length and the first length is different from a second length, and a filling length of the numbers is a difference between the first length and the second length; and the target terminal is one of the N terminals, and the second length is the longest length in the respective exclusive information corresponding to the N terminals.

Optionally, the exclusive sub-information further includes at least one of a random access response, a network connection establishment parameter, and a random access conflict resolution response; and the type label is configured to indicate a type of the exclusive information.

An exemplary embodiment of the present disclosure provides a random access message transmission apparatus, which can implement all or part of the steps performed by the target terminal in the above-mentioned embodiment shown in FIG. 6 or FIG. 8 of the present disclosure. The random access message transmission apparatus includes: a processor, a memory for storing processor-executable instructions; in which the processor is configured to: send a first random access message Msg. A to a base station; receive a second random access message Msg. B sent by the base station; in which the Msg. B includes respective exclusive information of N terminals, the N terminals include the target terminal, where N is an integer greater than or equal to 1; the exclusive information includes a type label of the exclusive information of a terminal; the type label is configured to indicate a length of the exclusive information of the terminal; extract a type label in an i-th exclusive information in the Msg. B in response to determining the i-th exclusive information is exclusive information of the target terminal, where 1≤i≤N, and i is an integer; and extract the exclusive information of the target terminal from Msg. B based on a length indicated by a type label in the i-th exclusive information.

Optionally, the exclusive information further includes a subheader and exclusive sub-information; and the type label is located in the subheader; or, the type label is in the exclusive sub-information.

Optionally, the subheader includes a random preamble identifier RAP ID; and the type label occupies M bits in the subheader when the type label is located in the subheader, where 1≤M<6, and the RAP ID occupies 6−M bits in the subheader.

Optionally, exclusive information of the target terminal in the Msg. B is filled with numbers when a length of the exclusive information of the target terminal in the Msg. B is a first length and the first length is different from a second length, and a filling length of the numbers is a difference between the first length and the second length; and the second length is the longest length in the respective exclusive information corresponding to the N terminals.

Optionally, the apparatus further includes: a first skipping module, configured to skip information of the second length and parsing (i+1)-th exclusive information in response to determining that i-th exclusive information parsed from the Msg. B is not the exclusive information of the target terminal, where i is not equal to N.

Optionally, the apparatus further includes: a second skipping module, configured to skip information on a length indicated by a type label in i-th exclusive information parsed from the Msg. B and parsing (i+1)-th exclusive information in response to determining that the i-th exclusive information is not the exclusive information of the target terminal, where i is not equal to N.

Optionally, the exclusive sub-information further includes at least one of a random access response, a network connection establishment parameter, and a random access conflict resolution response of a terminal; and the type label is configured to indicate a type of the exclusive information.

It can be understood that, in order to implement the above-mentioned functions, the base station and the target terminal include corresponding hardware structures and/or software modules for executing each function. In conjunction with the modules and algorithm steps of each example described in the embodiments disclosed in the present disclosure, the embodiments of the present disclosure can be implemented in hardware or a combination of hardware and computer software. Whether a function is performed by hardware or computer software-driven hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 18:
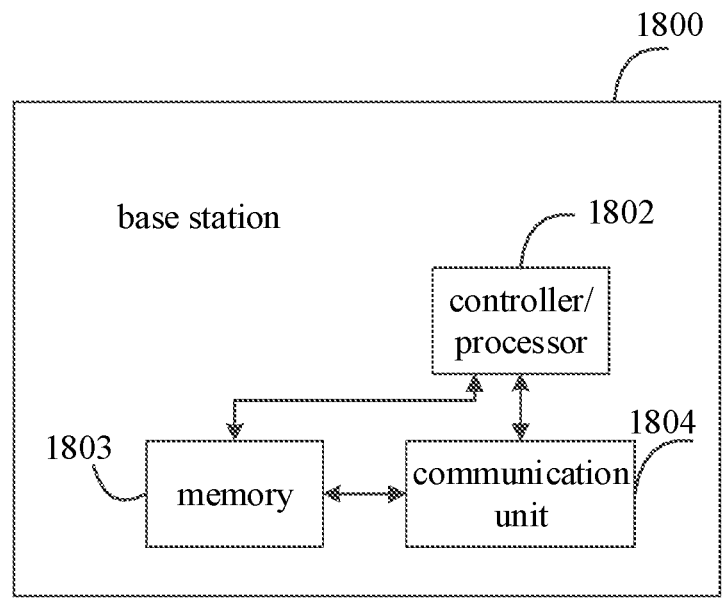
FIG. 18 is a schematic structural diagram of a base station according to an exemplary embodiment.

FIG. 18 is a schematic structural diagram of a base station according to an exemplary embodiment.

The base station 1800 includes a communication unit 1804 and a processor 1802. The processor 1802 may also be a controller, which is represented as "controller/processor 1802" in FIG. 18. The communication unit 1804 is used to support the base station to communicate with other network devices (e.g., terminals, other base stations, gateways, etc.).

Further, the base station 1800 may further include a memory 1803 for storing program codes and data of the base station 1800.

It will be appreciated that FIG. 18 only shows a simplified design of the base station 1800. In practical applications, the base station 1800 may include any number of processors, controllers, memories, communication units, etc., and all base stations that can implement the embodiments of the present disclosure fall within the protection scope of the embodiments of the present disclosure.

Figure 19:
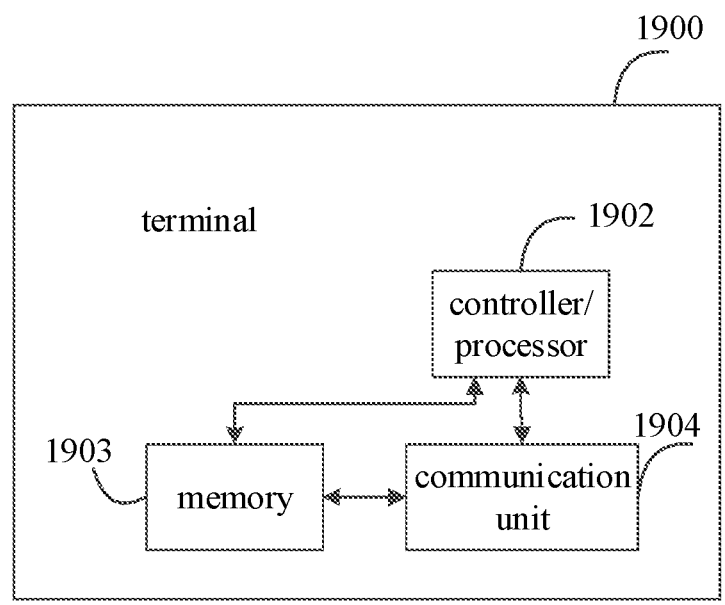
FIG. 19 is a schematic structural diagram of a terminal according to an exemplary embodiment.

FIG. 19 is a schematic structural diagram of a terminal according to an exemplary embodiment.

The terminal 1900 includes a communication unit 1904 and a processor 1902. The processor 1902 may also be a controller, which is represented as "controller/processor 1902" in FIG. 19. The communication unit 1904 is used to support the terminal to communicate with other network devices (e.g., terminals, other base stations, gateways, etc.).

Further, the terminal 1900 may further include a memory 1903 for storing program codes and data of the terminal 1900.

It can be understood that FIG. 19 only shows a simplified design of the terminal 1900. In practical applications, the terminal 1900 may include any number of processors, controllers, memories, communication units, etc., and all terminals that can implement the embodiments of the present disclosure fall within the protection scope of the embodiments of the present disclosure.

Those skilled in the art should realize that, in one or more of the above examples, the functions described in the embodiments of the present disclosure may be implemented by hardware, software, firmware, or any combination thereof. When implemented in software, the functions may be stored on or transmitted over as one or more instructions or code on a computer-readable medium. Computer-readable medium includes both computer storage medium and communication medium including any medium that facilitates transfer of a computer program from one place to another. A storage medium can be any available medium that can be accessed by a general purpose or special purpose computer.

Embodiments of the present disclosure also provide a computer storage medium for storing computer software instructions used by the above-mentioned base station, which includes a program designed for executing the above-mentioned random access message transmission method.

Embodiments of the present disclosure further provide a computer storage medium for storing computer software instructions used by the above-mentioned terminal, which includes a program designed for executing the above random access message transmission method.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A random access message transmission method, performed by a base station and comprising:
receiving first random access messages Msg A sent by N terminals, where N is an integer greater than or equal to 1;
sending a second random access message Msg B corresponding to the N terminals;
wherein, the Msg B comprises respective exclusive information of the N terminals, the exclusive information comprising a type label of the exclusive information of a terminal, the type label being configured to indicate a length of the exclusive information of the terminal; the type label corresponds to Type 1 or Type 2, Type 1 is a feedback from the base station to the terminal in response to determining that the base station successfully receives the Msg A sent by the terminal, Type 2 is a feedback from the base station to the terminal in response to determining that the base station fails to receive the Msg A sent by the terminal.

2. The method of claim 1, wherein the exclusive information further comprises a subheader and exclusive sub-information; and
the type label is located in the subheader.

3. The method of claim 2, wherein the subheader comprises a random preamble identifier RAP ID; and
the type label occupies M bits in the subheader when the type label is located in the subheader, where 1≤M<6, and the RAP ID occupies 6–M bits in the subheader.

4. The method of claim 2, wherein the exclusive sub-information further comprises at least one of a random access response, a network connection establishment parameter, and a random access conflict resolution response.

5. The method of claim 1, wherein,
exclusive information of a target terminal in the Msg B is filled with numbers when a length of the exclusive information of the target terminal in the Msg B is a first length and the first length is different from a second length, and a filling length of the numbers is a difference between the first length and the second length; and
the target terminal is one of the N terminals, and the second length is the longest length in the respective exclusive information corresponding to the N terminals.

6. A random access message transmission apparatus, applied in a base station and comprising:
a processor, a memory storing instructions executable by the processor, wherein the processor is configured to perform the random access message transmission method of claim 1.

7. A random access message transmission method, performed by a target terminal and comprising:
sending a first random access message Msg A to a base station;
receiving a second random access message Msg B sent by the base station; wherein the Msg B comprises respective exclusive information of N terminals, the N terminals comprise the target terminal, where N is an integer greater than or equal to 1; the exclusive information comprises a type label of the exclusive information of a terminal; the type label is configured to indicate a length of the exclusive information of the terminal; the type label corresponds to Type 1 or Type 2, Type 1 is a feedback from the base station to the terminal in response to determining that the base station successfully receives the Msg A sent by the terminal, Type 2 is a feedback from the base station to the terminal in response to determining that the base station fails to receive the Msg A sent by the terminal;
extracting a type label in an i-th exclusive information in the Msg B in response to determining the i-th exclusive information is exclusive information of the target terminal, where 1≤i≤N, and i is an integer; and
extracting the exclusive information of the target terminal from Msg B based on a length indicated by a type label in the i-th exclusive information.

8. The method of claim 7, wherein the exclusive information further comprises a subheader and exclusive sub-information; and
the type label is located in the subheader.

9. The method of claim 8, wherein the subheader comprises a random preamble identifier RAP ID; and
the type label occupies M bits in the subheader when the type label is located in the subheader, where 1≤M<6, and the RAP ID occupies 6−M bits in the subheader.

10. The method of claim 8, wherein the exclusive sub-information further comprises at least one of a random access response, a network connection establishment parameter, and a random access conflict resolution response of a terminal.

11. The method of claim 7, wherein,
exclusive information of the target terminal in the Msg B is filled with numbers when a length of the exclusive information of the target terminal in the Msg B is a first length and the first length is different from a second length, and a filling length of the numbers is a difference between the first length and the second length; and
the second length is the longest length in the respective exclusive information corresponding to the N terminals.

12. The method of claim 11, further comprising:
skipping information of the second length and parsing (i+1)-th exclusive information in response to determining that i-th exclusive information parsed from the Msg B is not the exclusive information of the target terminal, where I is not equal to N.

13. The method of claim 7, further comprising:
skipping information on a length indicated by a type label in i-th exclusive information parsed from the Msg B and parsing (i+1)-th exclusive information in response to determining that the i-th exclusive information is not the exclusive information of the target terminal, where i is not equal to N.

14. A random access message transmission apparatus, applied in a target terminal and comprising:
a processor,
a memory storing instructions executable by the processor,
wherein the processor is configured to:
send a first random access message Msg A to a base station;
receive a second random access message Msg B sent by the base station; wherein the Msg B comprises respective exclusive information of N terminals, the N terminals comprise the target terminal, where N is an integer greater than or equal to 1; the exclusive information comprises a type label of the exclusive information of a terminal; the type label is configured to indicate a length of the exclusive information of the terminal; the type label corresponds to Type 1 or Type 2, Type 1 is a feedback from the base station to the terminal in response to determining that the base station successfully receives the Msg A sent by the terminal, Type 2 is a feedback from the base station to the terminal in response to determining that the base station fails to receive the Msg A sent by the terminal;
extract a type label in an i-th exclusive information in the Msg B in response to determining the i-th exclusive information is exclusive information of the target terminal, where 1≤i≤N, and i is an integer; and
extract the exclusive information of the target terminal from Msg B based on a length indicated by a type label in the i-th exclusive information.

15. The apparatus of claim 14, wherein the exclusive information further comprises a subheader and exclusive sub-information; and
the type label is located in the subheader.

16. The apparatus of claim 15, wherein the subheader includes a random preamble identifier RAP ID; and
the type label occupies M bits in the subheader when the type label is located in the subheader, where 1≤M<6, and the RAP ID occupies 6−M bits in the subheader.

17. The apparatus of claim 15, wherein the exclusive sub-information further comprises at least one of a random access response, a network connection establishment parameter, and a random access conflict resolution response of a terminal.

18. The apparatus of claim 14, wherein,
exclusive information of the target terminal in the Msg B is filled with numbers when a length of the exclusive information of the target terminal in the Msg B is a first length and the first length is different from a second length, and a filling length of the numbers is a difference between the first length and the second length; and
the second length is the longest length in the respective exclusive information corresponding to the N terminals.

19. The apparatus of claim 18, further comprising:
a first skipping module, configured to skip information of the second length and parsing (i+1)-th exclusive information in response to determining that i-th exclusive information parsed from the Msg B is not the exclusive information of the target terminal, where i is not equal to N.

20. The apparatus of claim 14, further comprising:
a second skipping module, configured to skip information on a length indicated by a type label in i-th exclusive information parsed from the Msg B and parsing (i+1)-th exclusive information in response to determining that the i-th exclusive information is not the exclusive information of the target terminal, where i is not equal to N.

\* \* \* \* \*